(12) United States Patent
Tan et al.

(10) Patent No.: US 12,347,259 B2
(45) Date of Patent: Jul. 1, 2025

(54) AUTOMATIC BEVERAGE VENDING MACHINE

(71) Applicant: CROWN DIGITAL PTE LTD, Singapore (SG)

(72) Inventors: Pang Yeow Tan, Singapore (SG); Nitika Khanna, Singapore (SG)

(73) Assignee: CROWN DIGITAL PTE LTD, Singapore (SG)

( * ) Notice: Subject to any disclaimer, the term of this patent is extended or adjusted under 35 U.S.C. 154(b) by 0 days.

(21) Appl. No.: 18/264,935

(22) PCT Filed: Oct. 21, 2021

(86) PCT No.: PCT/SG2021/050637
§ 371 (c)(1),
(2) Date: Aug. 10, 2023

(87) PCT Pub. No.: WO2022/093114
PCT Pub. Date: May 5, 2022

(65) Prior Publication Data
US 2024/0304054 A1    Sep. 12, 2024

(30) Foreign Application Priority Data
Oct. 29, 2020    (CN) .......................... 202022445791.2

(51) Int. Cl.
*G07F 13/06*    (2006.01)
*B67D 1/08*    (2006.01)
*B67D 1/16*    (2006.01)

(52) U.S. Cl.
CPC ......... *G07F 13/065* (2013.01); *B67D 1/0888* (2013.01); *B67D 1/0894* (2013.01);
(Continued)

(58) Field of Classification Search
CPC ....... G07F 13/065; B67D 1/16; B67D 1/0888; B67D 1/0894; B67D 2210/00073; B67D 2210/00076
See application file for complete search history.

(56) References Cited

U.S. PATENT DOCUMENTS 10,239,742 B2 * 3/2019 Dresser ................ B67D 1/1236
11,026,529 B2 * 6/2021 Ferraro .............. A47G 19/2261

FOREIGN PATENT DOCUMENTS

JP        S54138978 U      9/1979
JP        2000298769 A    10/2000
(Continued)

OTHER PUBLICATIONS

International Search Report and Written Opinion of the corresponding PCT application No. PCT/SG2021/050637 mailed on Dec. 28, 2021.

*Primary Examiner* — Timothy L Maust
(74) *Attorney, Agent, or Firm* — Idea Intellectual Limited; Margaret A. Burke; Sam T. Yip

(57) ABSTRACT

The present disclosure relates to an automatic beverage vending machine. The vending machine includes at least one beverage maker operable for making at least one beverage. The vending machine further includes a receiving station operable for receiving at least one cup at an exterior of the vending machine and moving the cup to an interior of the vending machine. The vending machine further includes a conveying mechanism operable for transferring the cup from the receiving station to the beverage maker in order to receive the beverage into the cup. The vending machine further includes a controller connected to the beverage maker, the receiving station and the conveying mechanism, and operable for coordinating movement of receiving the cup, transferring the cup and dispensing the beverage into the cup.

18 Claims, 18 Drawing Sheets

(52) U.S. Cl.
CPC ...... *B67D 1/16* (2013.01); *B67D 2210/00073* (2013.01); *B67D 2210/00076* (2013.01)

(56) References Cited

FOREIGN PATENT DOCUMENTS

| | | | |
|---|---|---|---|
| JP | 2008186228 A | 8/2008 | |
| JP | 2008197699 A | 8/2008 | |
| JP | 6491198 B2 * | 3/2019 | ........... B67D 1/0877 |
| JP | 2020045121 A | 3/2020 | |
| KR | 102093088 B1 | 3/2020 | |
| WO | WO-2011000021 A1 * | 1/2011 | ........... B67D 1/0462 |

* cited by examiner

AUTOMATIC BEVERAGE VENDING MACHINE

The present application claims the filing date of Chinese Utility Model application Nr. 2020 2244 5791.2 as its priority date, which was filed with CNIPA (China National Intellectual Property Administration) on 29 Oct. 2020, and has the title of Automatic Beverage Station. All relevant content and/or subject matter of the earlier priority application is hereby incorporated by reference wherever appropriate.

The present disclosure generally relates to a vending machine for preparing and dispensing a beverage, and more particularly, to an automatic beverage vending machine for automatically receiving a cup from a customer, dispensing a beverage into the cup, and delivering the cup filled with the beverage back to the customer.

Beverage vending machines for filling and vending a cup with a beverage are known in the art. These beverage vending machines are commonly installed at commercial establishments such as, malls, restaurants, and cafeterias, for customers to purchase and drink the beverage of their choice. Although these beverage vending machines are automated, they still require some sort of human intervention to dispense the beverage and deliver the cup filled with the beverage to the customer. The use of labour in operating such beverage vending machine leads to an increase in the overall cost.

Further, in certain scenarios, a customer may place a cup in the beverage vending machine in an unready state. For example, the customer may accidentally place a cup in the beverage vending machine with a lid attached on top of it. The conventional beverage vending machines are not adapted to check the readiness of the cup and may dispense the beverage on the lid causing a mess. Similarly, in some scenarios, the cup may have not been cleaned after the previous usage. In such cases, receiving the beverage in said cup may alter the taste of the beverage thereby affecting the quality of the beverage.

Moreover, the conventional beverage vending machines usually serve the beverage in disposable paper cups or plastic cups. Using disposable cups create a problem of wastage of resources as well as causes environmental pollution.

Therefore, there is a need for a beverage vending machine that can perform the necessary tasks of preparing and dispensing beverages without human intervention. In addition, there is a need for a beverage vending machine that can detect the readiness of the cup placed for receiving the beverage. Also, there is a need for a beverage vending machine that can increase the reuse of cups thereby reducing the wastage of resources.

One aspect of the present invention relates to an automatic beverage vending machine. The automatic beverage vending machine is operable for automatically receiving a cup from a customer, dispensing at least one beverage into the cup, and delivering the cup filled with the at least one beverage back to the customer. The automatic beverage vending machine is further operable for detecting a readiness of the cup received from the customer and take necessary action in accordance with the state of the cup. The automatic beverage vending machine is further operable for working with a reusable cup in order to increase the customer engagement with the automatic beverage vending machine, as well as to reduce the wastage of resources caused due to usage of disposable cups.

According to an embodiment, an automatic beverage vending machine is disclosed. The automatic beverage vending machine includes at least one beverage maker operable for making at least one beverage. The automatic beverage vending machine further includes a receiving station operable for receiving at least one cup at an exterior of the automatic beverage vending machine and moving the at least one cup to an interior of the automatic beverage vending machine. The automatic beverage vending machine further includes a conveying mechanism operable for transferring the at least one cup from the receiving station to the at least one beverage maker in order to receive the at least one beverage into the at least one cup. The automatic beverage vending machine further includes a controller connected to the at least one beverage maker, the receiving station and the conveying mechanism such that the controller is operable for coordinating movement of receiving the cup, transferring the cup and dispensing the at least one beverage into the cup. The automatic beverage vending machine is operable for automatically performing the process of receiving the cup, transferring the cup, and dispensing the at least one beverage into the cup thereby eliminating the need for human intervention. Accordingly, the automated beverage vending machine saves cost and provides consistent quality of the beverage each time.

According to an embodiment, the automatic beverage vending machine further includes an integrated station that integrates a delivering station with the receiving station and is operable for receiving the at least one cup and/or delivering the at least one cup filled with the at least one beverage. The integrated station is operable for receiving the cup from the customer and moving the cup from the exterior of the automatic beverage vending machine to the interior of the automatic beverage vending machine. Once the cup is filled with the beverage, the integrated station is further operable for moving the cup from the interior of the automatic beverage vending machine to the exterior of the beverage vending machine so that the customer can pick up the cup filled with the beverage.

According to an embodiment, the receiving station, the delivering station, the integrated station or a combination of any of these stations comprise at least one pigeon hole unit operable for handling the at least one cup. The receiving station, the delivering station, the integrated station or a combination of these stations may include a plurality of pigeon hole units. Each of the pigeon hole unit is operable for receiving the cup from the customer and move the cup from the exterior of the automatic beverage vending machine to the interior of the automatic beverage vending machine. Similarly, when the cup is filled with the beverage, the pigeon hole unit is adapted to move the cup from the interior of the automatic beverage vending machine to the exterior of the automatic beverage vending machine.

According to an embodiment, the at least one pigeon hole unit includes a lock for enabling authorized retrieval of the at least one cup. The lock is operable for restricting and allowing an access to the cup. Due to the lock, only the authorized person is able to access the pigeon hole unit and pick up the cup placed inside the pigeon hole unit.

According to an embodiment, the at least one pigeon hole unit includes a pigeon hole cup holder for holding the at least one cup. The pigeon hole cup holder is adapted to hold the cup preferably in an upright position. Moreover, the pigeon hole cup holder is rotatable so as to move between a lock position and an open position. In the lock position, the customer can neither place nor retrieve the cup inside the pigeon hole cup holder, and in the open position, the customer can place and retrieve the cup from the pigeon hole cup holder.

According to an embodiment, the pigeon hole cup holder includes a drip tray for catching a drip of the at least one beverage falling from the at least one cup. The drip tray may include an absorbent mesh adapted to absorb the drips falling from the cup thereby keeping the pigeon hole cup holder clean. The absorbent mesh used in the drip tray may be made of any liquid absorbing material known in the art.

According to an embodiment, the at least one pigeon hole unit includes a pigeon hole receptacle for rotating the pigeon hole cup holder. The pigeon hole receptacle may be mounted at the bottom of the pigeon hole cup holder and includes an electric motor for rotating the pigeon hole cup holder.

According to an embodiment, the pigeon hole receptacle is configured to rotate the pigeon hole cup holder in at least one of a clockwise direction and an anticlockwise direction. The pigeon hole receptacle is operable for rotating the pigeon hole cup holder up to an angle of 180 degrees in both clockwise and anticlockwise direction to move the pigeon hole cup holder in the open and lock position.

According to an embodiment, the pigeon hole unit further includes a detector operable for detecting a readiness of the at least one cup before being moved to the interior of the automatic beverage vending machine. The readiness of the cup may be detected by various factors such as, but not limited to, whether the cup placed in the pigeon hole cup holder includes a lid attached to it, and/or whether the cup placed in the pigeon hole cup holder is fully empty, and/or whether the cup placed in the pigeon hole cup holder is stained with a beverage which the customer previously had, and so on.

According to an embodiment, the detector is connected to the controller. The controller is operable to generate an alert if the at least one cup is in an unready state and control the receiving station to transfer the cup from the exterior of the automatic beverage vending machine to the interior of the automatic beverage vending machine if the cup is in a ready state. For example, if the cup includes a lid, or contains a beverage already, or is stained with a beverage which the customer had previously, the detector may communicate to the controller that the cup is in an unready state. In such a case, the controller is operable to alert the customer via a visual or audio means about the state of the cup. Alternatively, if the cup is in a ready state, the detector communicates the controller about it, and the controller controls the receiving station to transfer the cup from the exterior of the automatic beverage vending machine to the interior of the automatic beverage vending machine.

According to an embodiment, the automatic beverage vending machine further includes a sensor to identify the at least one cup placed at the pigeon hole cup holder. The identity of the at least one cup includes identification information (e.g. by QR code printed on the reusable cup), electronic identity or identification device, such as identification code embedded in a RFID chip (also known as Radio Frequency Identification tag). The sensor includes an identification tag reader and the at least one cup comprises an identification tag. The identification tag reader is adapted to communicate with the identification tag and read the information stored in the identification tag. The identification tag reader may be a Radio Frequency Identification (RFID) reader and the identification tag may be a Radio Frequency Identification (RFID) tag.

According to an embodiment, the identification tag is configured to store information associated with a customer as well as the at least one beverage ordered by the customer. The identification tag helps the automatic beverage vending machine in preparing the beverage as per the preference of the customer. Further, the identification tag reader and the identification tag are configured to promote the usage of the automatic beverage vending machine by the customer.

According to an embodiment, the at least one beverage maker includes at least one spout for dispensing the at least one beverage into the at least one cup. The conveying mechanism is operable for placing the cup below the spout, and the beverage maker is operable for dispensing the beverage into the cup via the spout.

According to an embodiment, the conveying mechanism includes a robotic arm for transferring the at least one cup to the receiving station and the at least one beverage maker. The robotic arm may be an anthropomorphic arm and is configured to move between the receiving station and the beverage maker to transfer the cup from the pigeon hole cup holder to the beverage maker and back from the beverage maker to the pigeon hole cup holder.

According to an embodiment, the conveying mechanism further includes an end effector at an end of the robotic arm for gripping the at least one cup. The end effector is adapted to hold the cup while moving the cup to the receiving station and to the beverage maker.

According to an embodiment, the automatic beverage vending machine further comprises an automatic curtain connected to the controller. The automatic curtain is operable to cover the interior of the automatic beverage vending machine and/or expose the interior of the automatic beverage vending machine and a display mode for text and pictorial images.

According to an embodiment, the automatic curtain comprises an interactive user interface operable for receiving user input and/or providing information to the user. The automatic curtain may present information such as, but not limited to, name of the customer, status of beverage delivery, token number etc.

According to an embodiment, the automatic curtain includes an Organic Light Emitting Diode (OLED) screen. The OLED screen may be a transparent screen configured to cover the interior of the automatic beverage vending machine and/or expose the interior of the beverage vending machine.

According to an embodiment, the automatic beverage vending machine further comprises an order panel connected to the controller. The order panel is operable to display an option of beverages and facilitate a selection of a beverage from the option of beverages. The order panel may be a touchscreen that enables a customer to select the beverage of their choice. Further, the controller may be configured to update the option of beverages displayed on the order panel based on the status of the beverages available in the beverage maker.

According to an embodiment, the automatic beverage vending machine further comprises a Point Of Sale (POS) Terminal connected to the controller. The Point Of Sale Terminal is operable to facilitate a payment for a selected beverage, and dispense a receipt after making the payment for the selected beverage.

According to an embodiment, the automatic beverage vending machine further comprises an input panel to enable an input of a code by a customer for facilitating a delivery of the at least one cup filled with the beverage to the customer. The code may be a password or a Quick Response (QR) code which the customer can scan and confirm through his mobile device.

According to an embodiment, the automatic beverage vending machine further includes a cup washer configured to wash the cup. The conveying mechanism may be operable to move the cup to the cup washer in case the cup is not clean. The cup washer may be also accessible to the customer to wash themselves if the cup is not clean.

According to an embodiment, the automatic beverage vending machine further includes a cup holding station for keeping at least one cup filled with the beverage at a predetermined temperature. This may help in maintaining the temperature of the beverage in case the customer gets late to retrieve the cup from the pigeon hole unit thereby ensuring the quality of the beverage. Further, the cup holding station may be configured to keep the beverage hot or cold depending on the type of the beverage.

According to an embodiment, the at least one cup comprises a reusable cup, which is operable or configured to be used with the automatic vending machine. For example, the reusable cup is capable of being accepted or handled by the receiving station (e.g. pigeon hole unit), the conveyor mechanism and the controller. Often, an electronic identity of the reusable cup (e.g. identification tag or RFID chip) is pre-registered with the controller & recognised by the sensor. The reusable cup can be reused thereby increasing the engagement of the customer with the automatic beverage vending machine. Further, the reusable cup reduces the wastage of resources caused by the disposable cups.

According to an embodiment, a reusable cup includes a cup body having a base, an open top at an opposite end, and a sidewall extending between the base and the open top to define a height. The cup body is made of steel (e.g. stainless steel) and coated with an industrial porcelain enamel which provides robustness, elegant appearance to the reusable cup & good taste of beverage when using the reusable cup.

According to an embodiment, the reusable comprises an identification tag for storing an information associated with a customer as well as at least one beverage ordered by the customer. The identification tag helps the automatic beverage vending machine in preparing the beverage as per the preference of the customer.

According to an embodiment, the reusable cup the reusable cup includes a rubber sleeve for covering the cup body having an air gap between them. The air gap is formed between the rubber sleeve and the cup body when the rubber sleeve covers the cup body. The rubber sleeve provides softness for gripping the reusable cup and the air gap between the cup body and the rubber sleeve reduces the heat conduction between them.

According to an embodiment, the reusable cup includes a lid adapted to fit on the open top of the cup body for covering & sealing the reusable cup. The lid is provided to prevent spillage of the beverage.

According to an embodiment, the lid of the reusable cup is made of a transparent material. The transparent lid enables to see an interior of the reusable cup.

According to an embodiment, the reusable cup includes a suction cup adapted to fit on a bottom of the cup body for firmly gripping the cup to a surface. The suction cup helps in keeping the reusable cup firm on surfaces such as, a dashboard of the car while driving.

According to an embodiment, the reusable cup includes a holder in surrounding contact with the cup body for facilitating holding of the reusable cup. The holder provides a cool area for gripping the reusable cup even with hot beverage inside the reusable cup. Further, the holder includes a provision to hold a stirrer or spoon.

According to an embodiment, the reusable cup comprises a temperature sensor for determining a temperature of the at least one beverage inside the reusable cup. Due to the temperature sensor, the customer can gauge the temperature of the beverage before drinking the beverage.

According to an embodiment, the reusable cup includes a heater for keeping the at least one beverage inside the reusable cup to be at a predetermined temperature for a predetermined period of time. The heater may include an active heater with a local power source and/or a passive heater for heating by induction.

According to an embodiment, a method of operating an automatic beverage vending machine is disclosed. The method includes a step of receiving an order for at least one beverage. The method further includes another step of receiving at least one cup in a receiving station. The method further includes another step of detecting whether the cup is in a ready state for receiving the at least one beverage. The method further includes generating an alert if the at least one cup is not in a ready state. The method further includes another step of operating the receiving station form moving the at least one cup from an exterior of the automatic beverage vending machine to an interior of the automatic beverage vending machine. The method further includes another step of controlling a conveying mechanism to transfer the at least one cup from the receiving station to at least one beverage maker. The method further includes another step of controlling the at least one beverage maker to dispense the at least one beverage into the at least one cup. The method further includes another step of controlling the conveying mechanism to transfer the at least one cup filled with the beverage to the receiving station. The method further includes another step of operating the receiving station for moving the at least one cup from the interior of the automatic beverage vending machine to the exterior of the automatic beverage vending machine.

The method further includes a step of determining a vacant pigeon hole cup holder for receiving the at least one cup from a customer, and notifying the customer of the respective pigeon hole cup holder.

The method further includes a step of determining a vacant pigeon hole cup holder for delivering the at least one cup with the at least one beverage, and notifying the customer of the respective pigeon hole cup holder.

It is to be understood that both the foregoing general description and the following detailed description are exemplary and explanatory only and are not restrictive of the disclosure, as claimed.

So that the manner in which the above recited features of the present disclosure can be understood in detail, a more particular description of the disclosure, briefly summarized above, may have been referred by embodiments, some of which are illustrated in the appended drawings. It is to be noted, that the appended drawings illustrate only typical embodiments of this disclosure and are therefore not to be considered limiting of its scope, for the disclosure may admit to other equally effective embodiments.

These and other features, benefits, and advantages of the present disclosure will become apparent by reference to the following Figures, with like reference numbers referring to like structures across the views, wherein.

Figure 1:
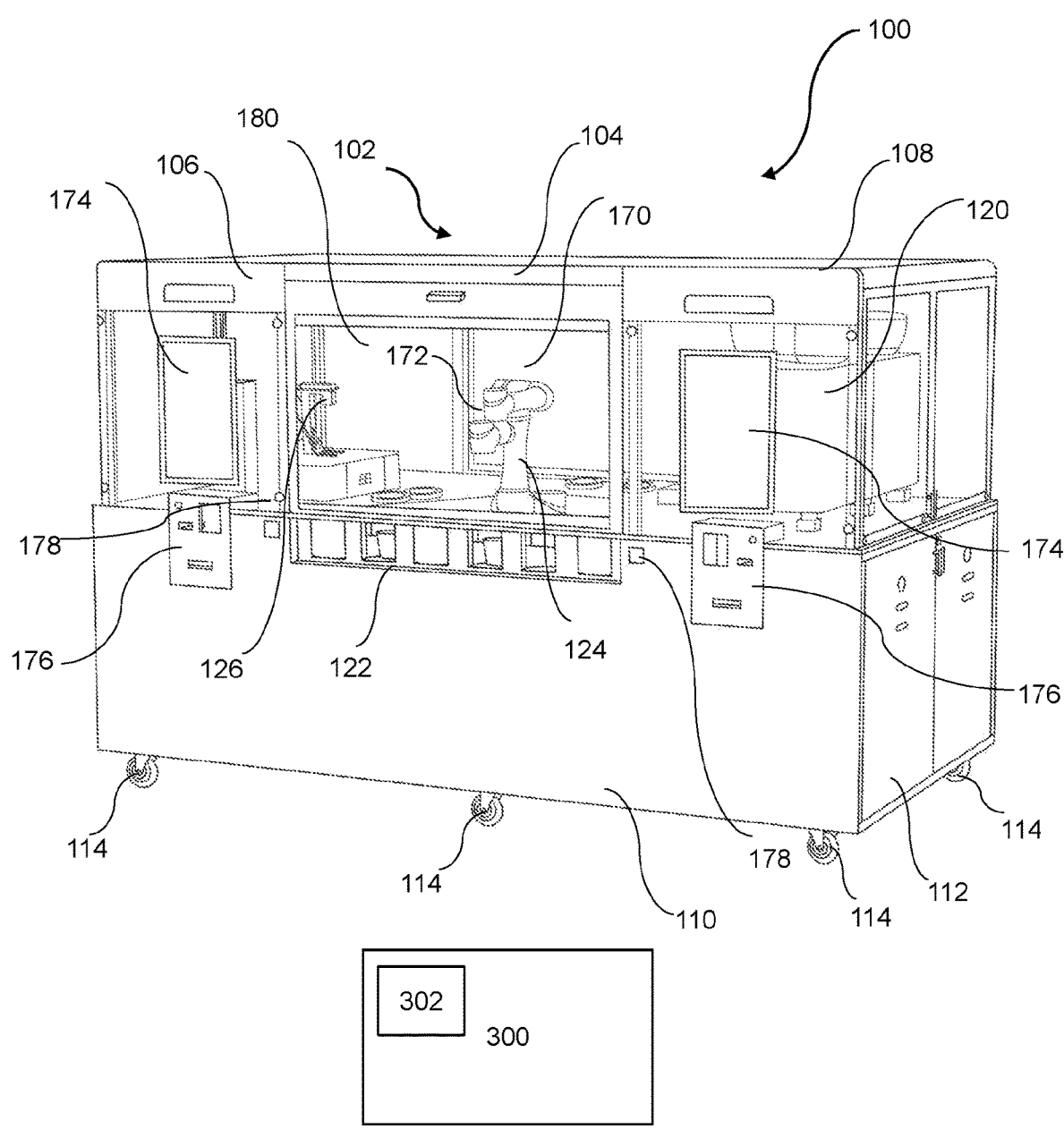
FIG. 1 illustrates a perspective front view of an automatic beverage vending machine, in accordance with an exemplary embodiment of the present disclosure.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organisational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper." and the like, may be used herein for ease of description to describe one element's or feature's relationship to another element or feature, as illustrated in the drawings. It should be recognised that the spatially relative terms are intended to encompass different orientations in addition to the orientation depicted in the Figures. For example, if an object in the Figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

Referring now to FIG. 1, a perspective front view of an automatic beverage vending machine 100 is illustrated, in accordance with an exemplary embodiment of the present disclosure. The automatic beverage vending machine (hereinafter referred to as 'vending machine') 100 may be employed in establishments such as, but not limited to, malls, cafeterias, workplaces etc. The vending machine 100 is operable for automatically performing the steps of receiving a cup from a customer, preparing a beverage ordered by the customer, dispensing the beverage into the cup, and delivering the cup filled with the beverage back to the customer.

The vending machine 100 includes may include a housing 102 for enclosing the components of the vending machine 100. It will be apparent to a person skilled in the art that the shape and size of the housing 102 may not be limited to the embodiment as shown in FIG. 1, and the housing 102 of other shapes and sizes may be also employed. In certain embodiments, the housing 102 may be divided into multiple sections, for example, a middle section 104, a left section 106 and a right section 108. These sections may be formed by inserting vertical walls inside the housing 102 such that each vertical wall acts as a partition between two sections of the housing 102. It will be apparent to a person skilled in the art that the number of sections will depend on the number of vertical walls arranged inside the housing 102. Further, the housing 102 may be made of a transparent material for enabling the customers to view an interior of the housing 102. A person skilled in the art will appreciate that the housing 102 may be made of any material known in the art and may not be limited to the transparent material. The vending machine 100 may further include a cabinet 110 below the housing 102 to store articles associated with the vending machine 100. In some embodiments, the cabinet 110 may be adapted to cover the wiring of the components enclosed within the housing 102. In addition, the cabinet 110 may include a door 112 to provide access to an interior of the cabinet 110. It will be apparent to a person skilled in the art that the door 112 may be provided on any side of the cabinet 110 and not limited to the side as shown in the FIG. 1. In some embodiments, the vending machine 100 may further include a plurality of wheels 114 for facilitating movement of the vending machine 100.

The vending machine 100 includes a beverage maker 120, a receiving station 122, a conveying mechanism 124, and a controller 300 in communication with the beverage maker 120, the receiving station 122 and the conveying mechanism 124. The controller 300 is configured to operate the beverage maker 120, the receiving station 122 and the conveying mechanism 124 for automatically performing the functions of the vending machine 100. The beverage maker 120 is operable for preparing and dispensing at least one type of beverage. The beverage maker 120 may prepare beverages such as, but not limited to, coffee, tea, milk, juice, carbonated drinks etc. In an embodiment, the vending machine 100 may include a plurality of beverage makers 120 such that each beverage maker 120 may function independent to the other beverage makers 120. Further, in some embodiments, the vending machine 100 may include a plurality of beverage makers 120 such that each beverage maker 120 is operable for dispensing a different type of beverage. For example, one beverage maker 120 may dispense tea, another beverage maker 120 may dispense coffee, yet another beverage maker 120 may dispense juice and so on. In certain embodiments, the beverage maker 120 may store one or more ingredients for preparing a beverage when an order is received. The beverage maker 120 further includes at least one spout 126 for dispensing the beverage into a cup. For the purpose of explanation, the cup may be positioned below the spout 126, and the beverage maker 120 dispenses the selected beverage into the cup via the spout 126. In addition, the beverage maker 120 is in communication to the controller 300 which is configured to operate the beverage maker 120. The controller 300 includes a memory 302 stored with a set of instruction for operating the beverage maker 120.

Figure 2:
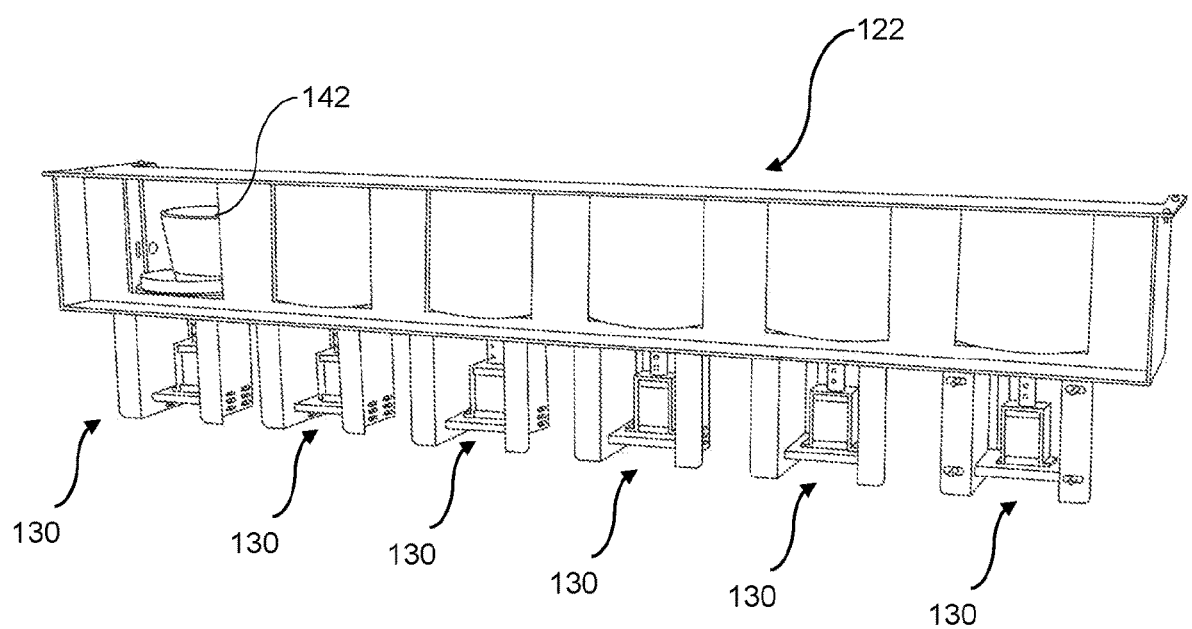
FIG. 2 illustrates perspective front view of a receiving station, in accordance with an exemplary embodiment of the present disclosure.
Figure 3:
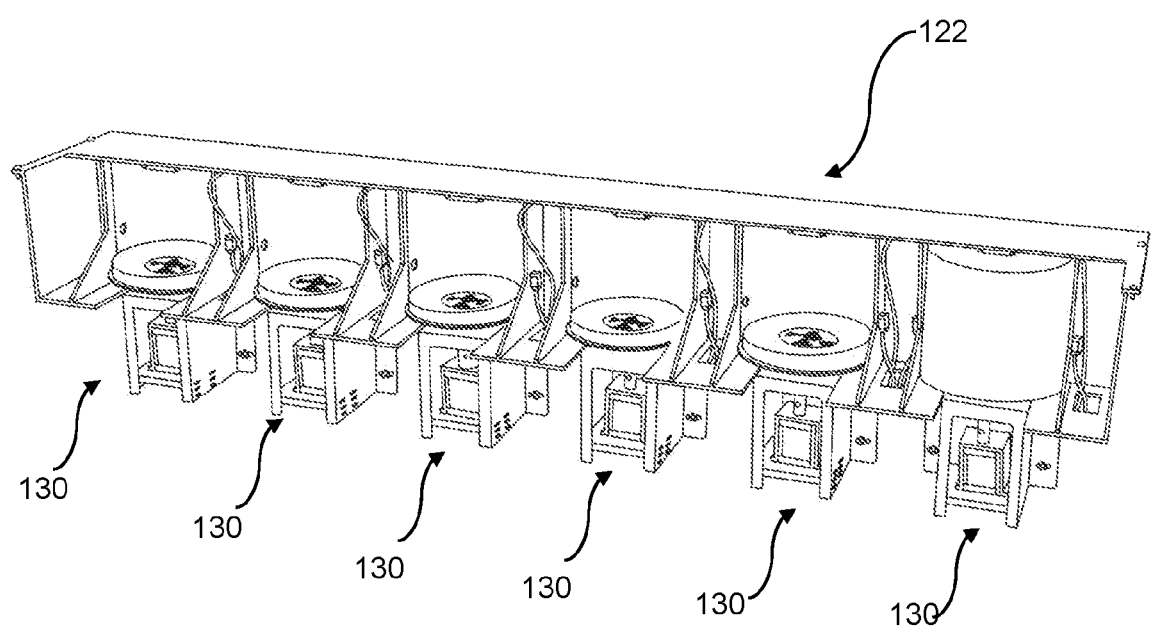
FIG. 3 illustrates a perspective rear view of the receiving station, in accordance with an exemplary embodiment of the present disclosure.

The vending machine 100 further includes the receiving station 122 arranged on a front side of the vending machine 100. For the purpose of explanation, when a customer approaches the vending machine 100 from the front, the receiving station 122 will be both visible and accessible to the customer. The receiving station 122 is operable for receiving a cup at an exterior of the vending machine 100 and moving the cup to an interior of the vending machine 100. In other words, the receiving station 122 is operable for moving the cup received from the customer inside the vending machine 100. In an embodiment, the vending machine includes an integrated station that integrates the receiving station 122 with a delivering station that is operable for moving the cup filled with the beverage from the interior of the vending machine 100 to the exterior of the vending machine 100. In other words, the delivering station is operable for moving the cup filled with the beverage from inside the vending machine 100 to the customer present outside the vending machine 100. For the ease of explanation, the receiving station 122, the delivering station and the integrated station are commonly referred to as the receiving station 122. Accordingly, a person skilled in the art will understand that the receiving station 122 is operable for both receiving and delivering the cup. Referring to FIG. 2 and FIG. 3, a front perspective view and a rear perspective view respectively of the receiving station 122 is illustrated, in accordance with an embodiment of the present disclosure. As can be seen from the FIG. 2 and FIG. 3, the receiving station 122 is operable for receiving and delivering a plurality of cups simultaneously. Further, the receiving station 122 is operable for receiving and delivering each of the cups independently to each other.

Figure 4:
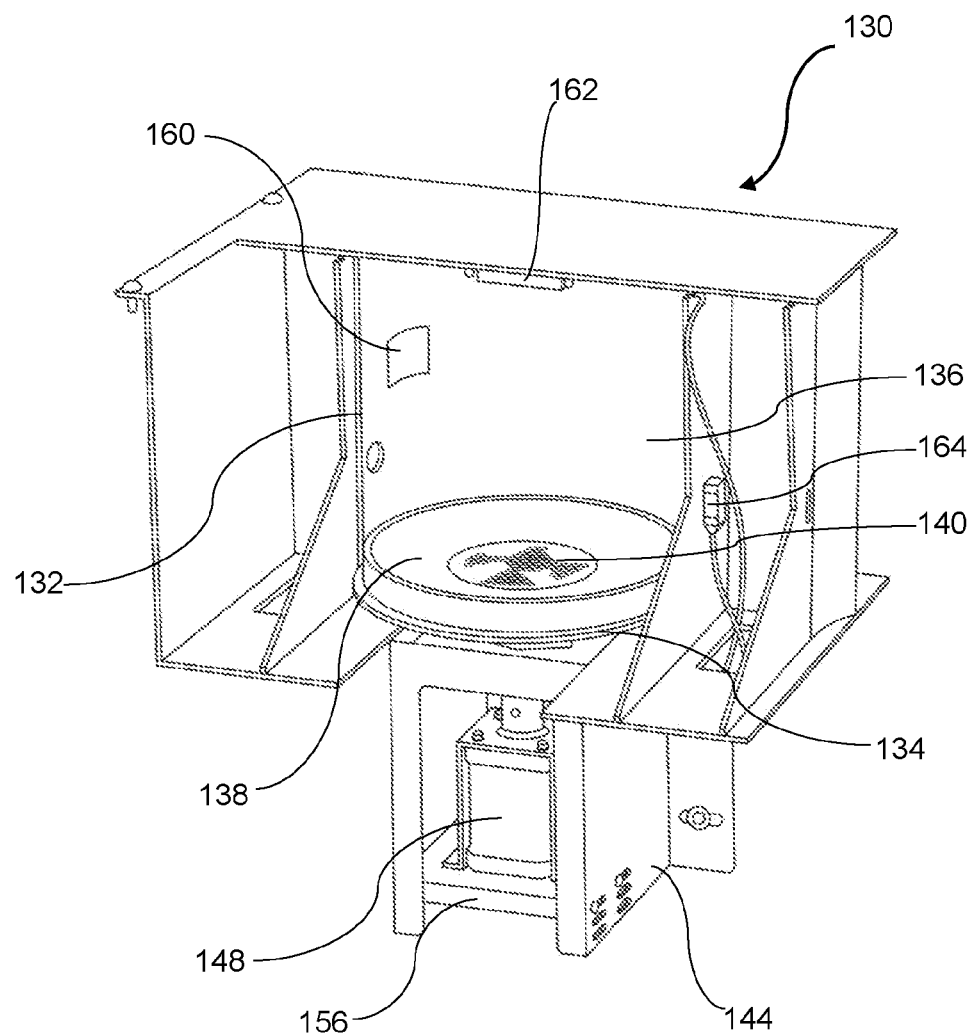
FIG. 4 illustrates a perspective front view of a pigeon hole unit, in accordance with an exemplary embodiment of the present disclosure.
Figure 5:
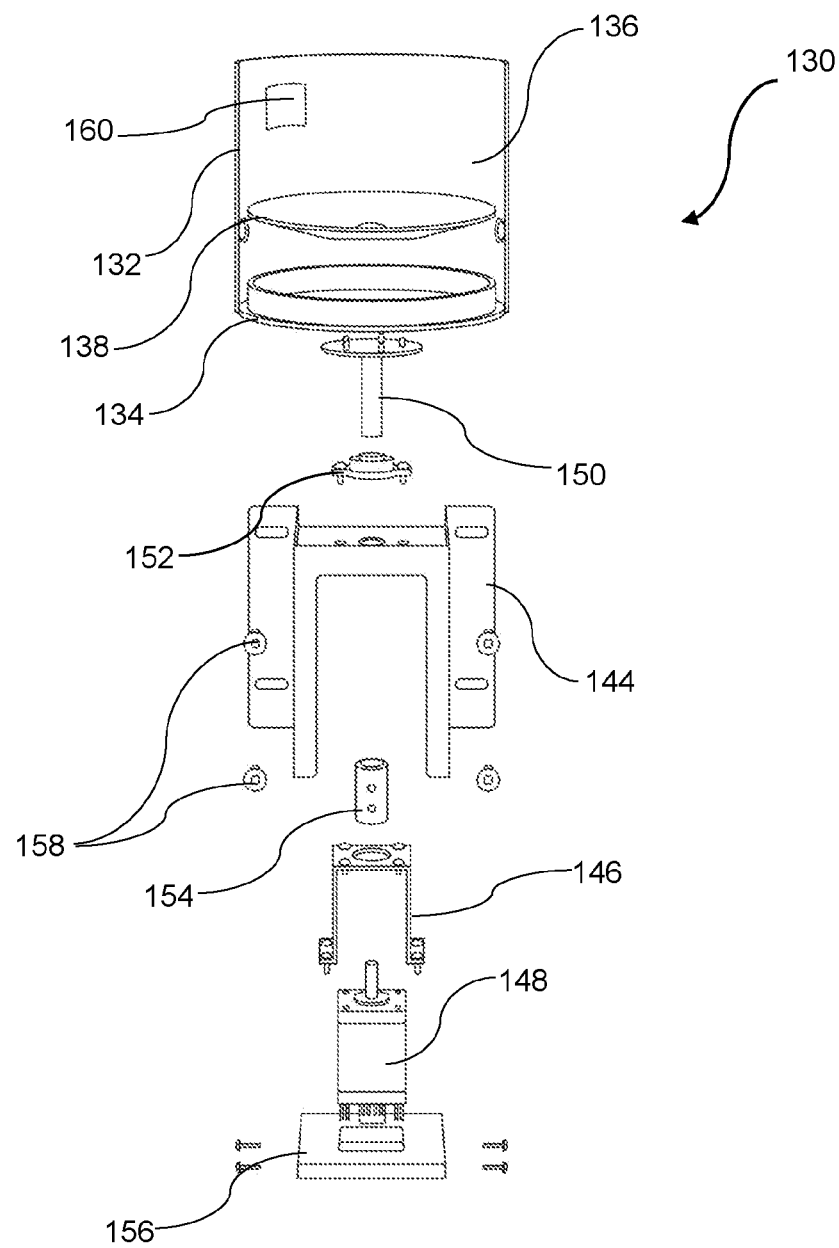
FIG. 5 illustrates an exploded front view of the pigeon hole unit, in accordance with an exemplary embodiment of the present disclosure.
Figure 6:
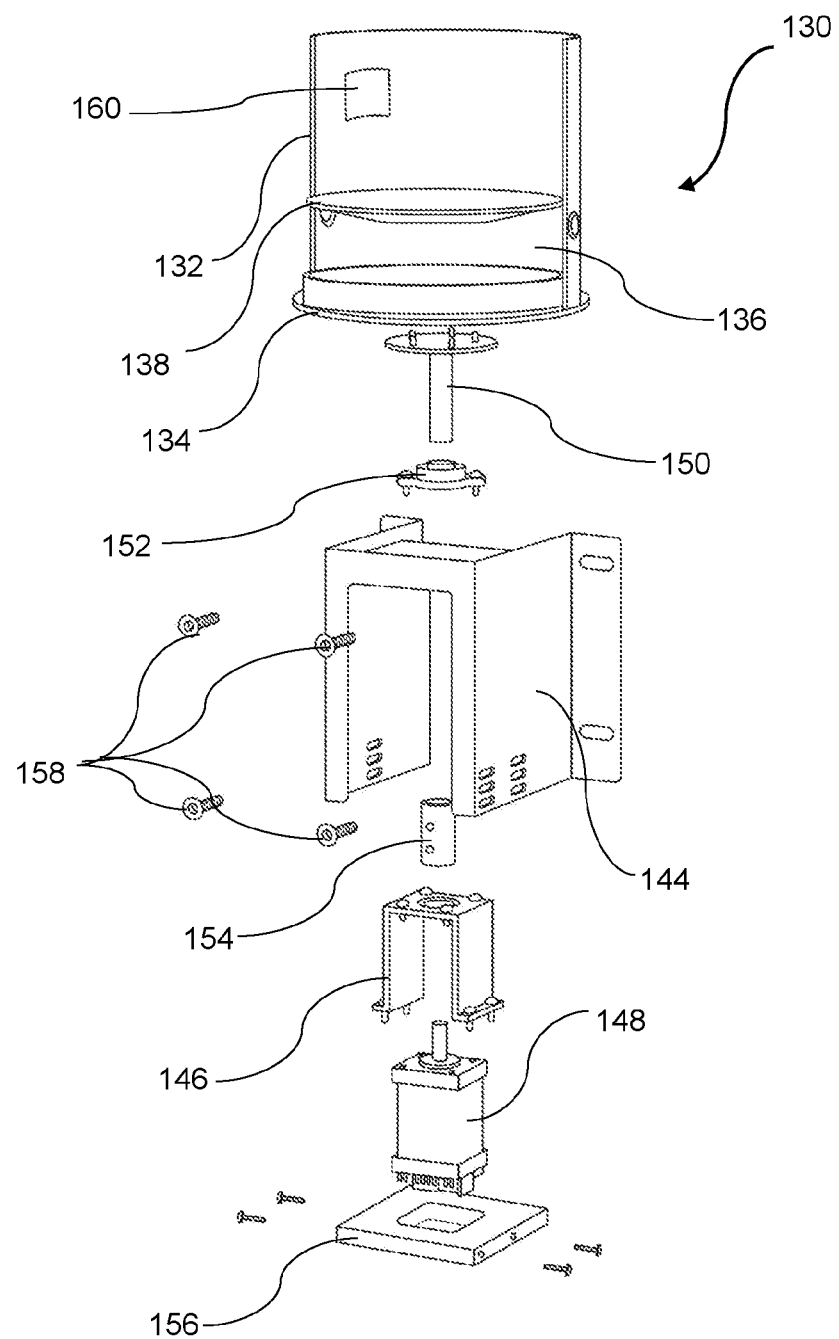
FIG. 6 illustrates an exploded perspective view of the pigeon hole unit, in accordance with an exemplary embodiment of the present disclosure.

The receiving station 122 includes at least one pigeon hole unit 130 operable for handling the cup. In a preferred embodiment, the receiving station 122 may include a plurality of pigeon hole units 130 as shown in FIG. 2 and FIG. 3. Having a plurality of pigeon hole units 130 may enable the vending machine to receive and deliver multiple cups at the same time thereby serving multiple customers simultaneously. Referring now to FIG. 4-FIG. 6, a perspective view, an exploded front view and an exploded perspective view respectively of the pigeon hole unit 130 is illustrated, in accordance with an exemplary embodiment of the present disclosure. The pigeon hole unit 130 is operable for receiving the cup from the customer and moving the cup from the exterior of the vending machine 100 to the interior of the vending machine 100. Similarly, when the cup is filled with the beverage, the pigeon hole unit is operable for moving the cup from the interior of the vending machine 100 to the exterior of the vending machine 100.

The pigeon hole unit 130 includes a pigeon hole cup holder 132 for holding the cup. The pigeon hole cup holder 132 includes a base 134 which acts as a resting surface for the cup when the cup is placed inside the pigeon hole cup holder 132. In an embodiment, the base 134 may have a circular shape and may be arranged horizontally for keeping the orientation of the cup horizontal. The pigeon hole cup holder 132 further includes a curved side wall 136 which acts as a door for the pigeon hole cup holder 132, and is configured to allow and restrict the access inside the pigeon hole cup holder 132. The pigeon hole cup holder 132 further includes a drip tray 138 for catching a drip of the beverage falling from the cup. For the purpose of explanation, when the cup filled with the beverage is placed inside the pigeon hole cup holder 132, few drops of the beverage may slide and fall from an outer surface of the cup and will be collected in the drip tray 138. Additionally, the drip tray 138 may include an absorbent mesh 140 on the top surface for absorbing the drips falling from the cup thereby keeping the one pigeon hole cup holder 132 clean.

The pigeon hole unit 130 further defines at least one pigeon hole opening 142 (shown in FIG. 2) for placing the cup inside the pigeon hole cup holder 132. For the purpose of explanation, the customer may place and receive the cup from the pigeon hole cup holder 132 via the pigeon hole opening 142. As specified above, the curved side wall 136 of the pigeon hole cup holder 132 is operable for opening and closing the pigeon hole opening 142.

The pigeon hole unit 130 further includes a pigeon hole receptacle 144 mounted at the bottom of the pigeon hole cup holder 132 and is adapted to rotate the pigeon hole cup holder 132. The pigeon hole receptacle 144 may include a motor bracket 146 for housing an electric motor 148 that is configured to drive the pigeon hole cup holder 132. Further, based on the rotation of the pigeon hole cup holder 132, the pigeon hole opening 142 may be closed and opened. The pigeon hole receptacle 144 may be configured to rotate the pigeon hole cup holder 132 in at least one of a clockwise direction and an anticlockwise direction. The pigeon hole receptacle 144 may further rotate the pigeon hole cup holder 132 up to an angle of 180 degrees to open and close the pigeon hole opening 142. For the purpose of explanation, the pigeon hole cup holder 132 may rotate 180 degrees to allow access to the pigeon hole cup holder 132 to receive the cup, and may rotate 180 degrees again to restrict the access to the pigeon hole cup holder 132 and move the cup inside the vending machine 100. It will be apparent to a person skilled in the art that each of the pigeon hole units 130 is adapted to work independently, and therefore multiple orders of beverage could be processed simultaneously thereby serving multiple customers at the same time.

The pigeon hole unit 130 may also include other components for fulfilling its function such as a custom flange 150 for supporting the pigeon hole cup holder 132, a ball bearing 152 for reducing rotational friction when the pigeon hole cup holder 132 rotates; a custom coupler 154 for coupling the pigeon hole cup holder 132 and the pigeon hole receptacle 144; and a base 156 for supporting all the components mentioned above. In addition, screws 158 are used to couple the components described above for forming the pigeon hole unit 130.

The pigeon hole unit 130 further includes a detector 160 operable for detecting a readiness of the cup before the cup is moved to the interior of the vending machine 100. The readiness of the cup will be determined based on various factors such as, but not limited to, whether a lid of the cup is removed and/or whether the cup is fully empty and/or whether the cup is stained with the beverage collected previously in the cup etc. It should be noted that the factors for determining readiness of the cup may not be limited to the above, and other factors may also be considered. Further, the detector 160 may detect the readiness based on different ways known in the art. In an embodiment, a camera is installed in the pigeon hole cup holder 132 that is able to do edge Artificial Intelligence inferencing to recognize if the cup lid has been removed, or if the cup is dirty or if the cup is empty. Moreover, photo evidence may be taken of the cup and stored in the memory 302 for verification in future if issues arise. In certain embodiments, a weight sensor may be installed in the base 134 to determine the weight of the cup placed in the pigeon hole cup holder 132. The detector 160 may prevent any cup to enter into the vending machine 100 that is half full, dirty or covered with a lid or have other substances inside the cup that might cause food poisoning or subsequent overfilling.

The pigeon hole unit 130 further includes a sensor 162 to identify the cup placed at in the pigeon hole cup holder 132. The sensor 162 may be an identification tag reader attached at a top ceiling of the pigeon hole cup holder 132 and configured to read an identification tag on a cup. In an embodiment, the identification tag reader may include an Radio Frequency Identification (RFID) antenna as an RFID reader attached to the top ceiling of the pigeon hole unit 130 for reading information from an RFID tag of a cup. For the purpose of explanation, the identification tag may be configured to store information associated with the customer as well as the beverages ordered by the customer. In particular, the identification tag may store information such as the name of the customer, the preference of the beverage of the customer, specifically, information relating to the type and quantity of the beverage. The identification tag may further store information of the type and quantity of the additives (for example, sugar, milk, and the like) that the customer selects while ordering the beverage. In some embodiments, the pigeon hole cup holder 132 may further include a presence sensor 164 attached to the curved side wall 136 of the pigeon hole cup holder 132 for detecting whether a cup is placed in the pigeon hole cup holder 132. The presence sensor 164 may be a proximity sensor configured to detect the presence of the cup in the pigeon hole cup holder 132.

The vending machine 100 further includes the conveying mechanism 124 operable for transferring the cup from the receiving station 122 to the beverage maker 120, and back from the beverage maker 120 to the receiving station 122. Specifically, the conveying mechanism 124 is operable for transferring the cup from the pigeon hole cup holder 132 to the beverage maker 120 and back from the beverage maker 120 to the pigeon hole cup holder 132. The conveying mechanism 124 includes a robotic arm 170 (shown in FIG. 1) configured to move between the pigeon hole cup holder 132 and the beverage maker 120. The conveying mechanism 124 further comprises an end effector 172 at an end of the robotic arm 170 for gripping the cup. The end effector 172 is adapted to hold the cup while moving to the receiving station 122 and the beverage maker 120. Further, it will be apparent to a person skilled in the art that the end effector 172 may not be limited to the one shown in FIG. 1 and other types of end effectors may also be implemented on the robotic arm 170.

The vending machine 100 further includes an order panel 174 (shown in FIG. 1) operable for displaying an option of beverages. The order panel 174 displays the option of beverages from which the customer can choose a desired beverage. In particular, the order panel 174 may be an interactive touchscreen for enabling the customers to select the beverage. The order panel 174 may be further operable for facilitating a selection of a desired beverage from the option of beverages. In certain embodiments, the vending machine 100 may include two order panels 174, one arranged at the left section 106 and the other arranged at the right section 108 as shown in FIG. 1. It will be apparent to a person skilled in the art that having two independent ordering panel 174 may enable customers to independently order their beverages. The order panel 174 may be in communication to the controller 300 and the controller 300 may be configured to update the option of beverages shown in the order panel according to the beverages available in the beverage maker 120.

The vending machine 100 further includes a Point Of Sale Terminal 176 (shown in FIG. 1) operable for facilitating a payment for a selected beverage, and dispensing a receipt after making the payment for the selected beverage. The Point Of Sale Terminal 176 may be adapted to receive payment via any means such as (Unified Payments Interface) UPI transaction, Debit and Credit cards, Net banking etc. Similar to the order panel 174, the vending machine may include two Point Of Sale Terminals 176, one arranged on the left section 106 and the other arranged on the right section 108. Therefore, two customers may simultaneously use the vending machine 100 at the left section 106 and the right section 108 respectively. In some embodiments, both the order panel 174 and the Point Of Sale Terminal 176 may be integrated into a single unit.

The vending machine 100 further includes an input panel 178 (shown in FIG. 1) to enable an input of a code by the customer for facilitating a delivery of the cup filled with the beverage to the customer. The input panel 178 may be a keypad for entering an alphanumeric code, or may be a QR code scanner for scanning the code received by the customer in the receipt of the order. The input panel 178 may be linked to the pigeon hole unit 130 such that on entering the correct code the pigeon hole cup holder 132 may rotate and move from a lock position to an open position thereby allowing the customer to retrieve the cup. The input panel 178 is configured to confirm the identity of the customer allows access to the pigeon hole cup holder 132 only when the identity of the customer is confirmed.

Figure 7:
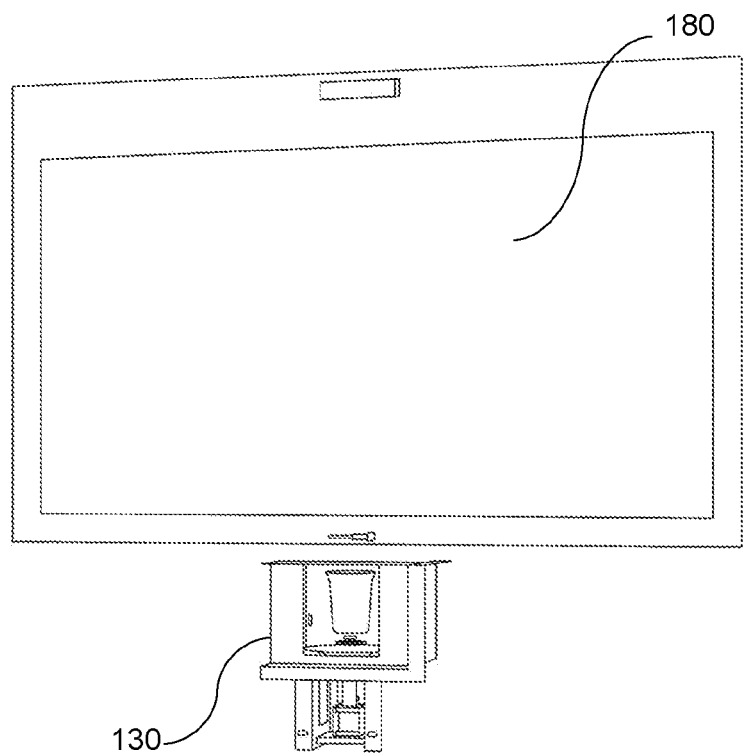
FIG. 7 illustrates a front perspective view of an automatic curtain, in accordance with an exemplary embodiment of the present disclosure.

Referring now to FIG. 7, a front perspective view of an automatic curtain 180, in accordance with an exemplary embodiment of the present disclosure. The automatic curtain 180 is operable to cover the interior of the vending machine 100 and/or expose the interior of the vending machine 100 and a display mode for text and pictorial images. The automatic curtain 180 includes an interactive user interface operable for receiving a user input and/or providing information to the user. The automatic curtain 180 may present information such as, but not limited to, name of the customer, status of beverage delivery, token number, warning messages etc. The automatic curtain 180 may further present advertisements and interactive games for the customers. The automatic curtain 180 may be arranged on a front side of the vending machine 100 and preferably above the receiving station 122 as shown in the FIG. 1. In an embodiment, the automatic curtain 180 includes an Organic Light Emitting Diode (OLED) screen and specifically the OLED screen may be a transparent screen.

The vending machine 100 further comprises a cup washer configured to wash the cup. The cup washer may include a water nozzle for spraying water on to the cup. The cup washer may further include a soap dispenser for dispensing liquid soap for washing the cup. The cup washer may be arranged inside the housing 102 and may also include a sink to collect the water after washing. In an embodiment, the customer may have an option to choose whether the customer wants the vending machine 100 to wash the cup. In another embodiment, the vending machine 100 is configured to wash all the cups before dispensing the beverage into the cup. The conveying mechanism 124 may be further programmed to pick up the cup and move the cup to the cup washer for washing the cup.

According to an embodiment, the vending machine 100 further comprises a cup holding station for keeping a filled cup at a predetermined temperature. The cup holding station may include a warmer or a refrigerator to keep the cup filled with the beverage in either a hot condition or a cold condition. The cup filled with the beverage is kept in the holding station when the customer is late in collecting the cup placed at the pigeon hole cup holder 132. In such a case, after a predefined period of time, the conveying mechanism 124 is adapted to move the cup from the pigeon hole cup holder to the holding station and maintain the temperature of the beverage at the required temperature.

Figure 8:
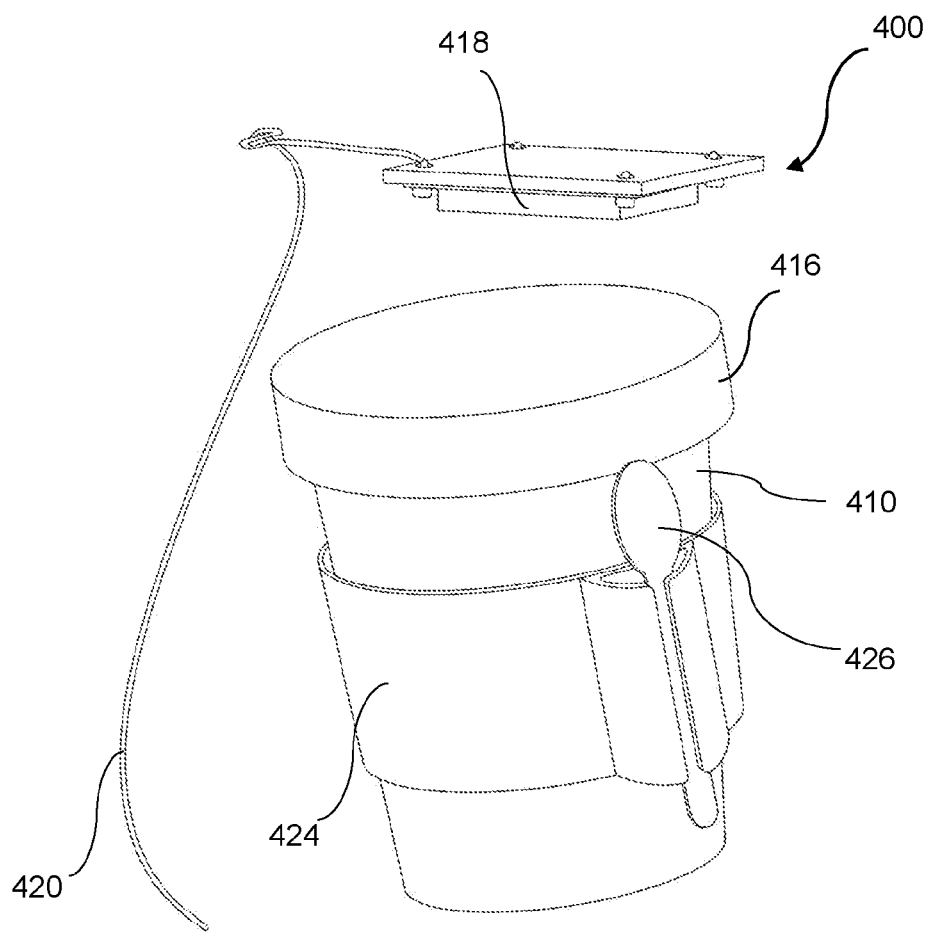
FIG. 8 illustrates a perspective view of a reusable cup, in accordance with an exemplary embodiment of the present disclosure.
Figure 9:
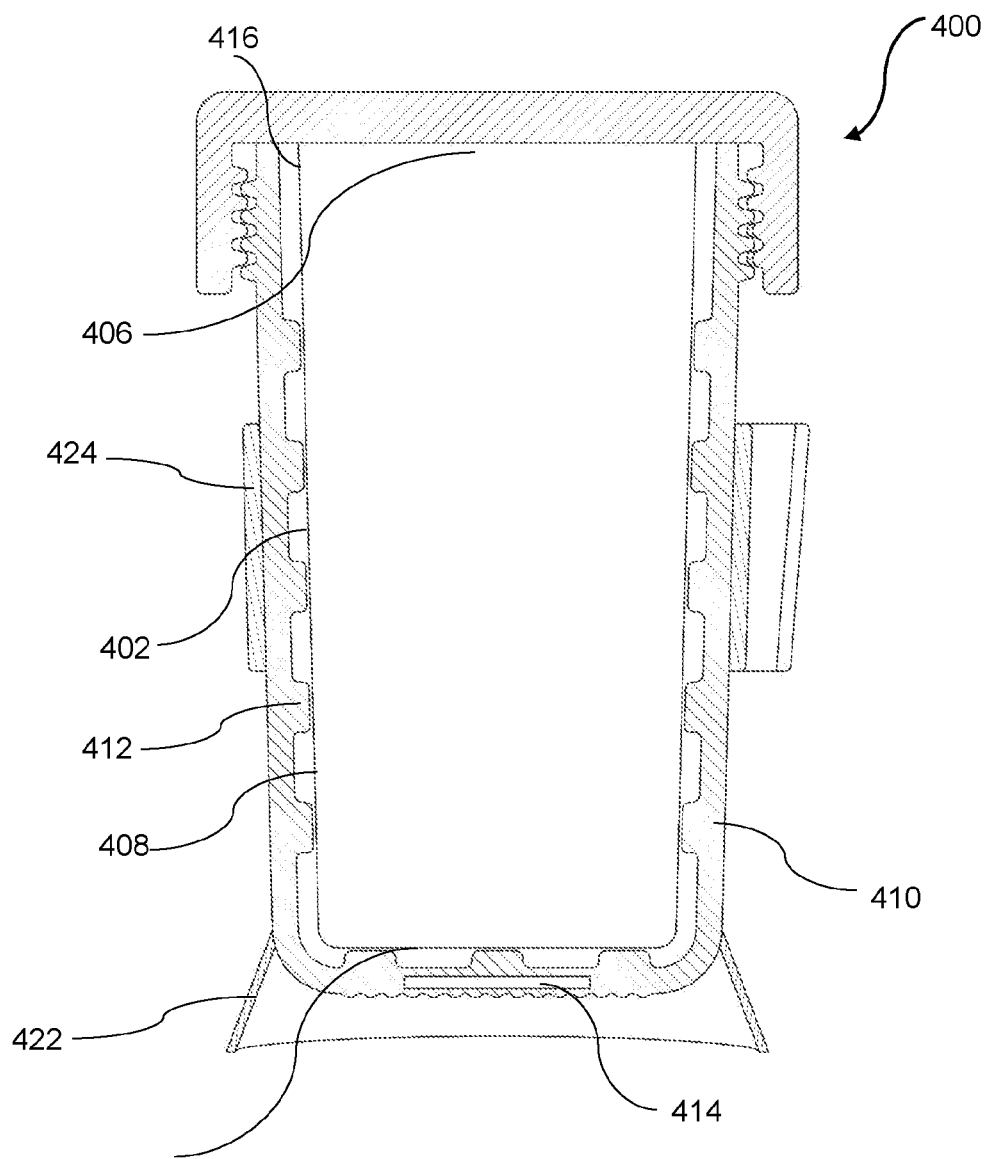
FIG. 9 illustrates a cross-section view of the reusable cup, in accordance with an exemplary embodiment of the present disclosure.

Referring now to FIG. 8 and FIG. 9, a perspective view and a cross-section view of a reusable cup 400 is illustrated, in accordance with an exemplary embodiment of the present disclosure. The reusable cup 400 is associated with the vending machine 100 and is configured to receive a beverage from the vending machine 100. The reusable cup 400 includes a cup body 402 having a base 404, an open top 406 at an opposite end, and a sidewall 408 extending between the base 404 and the open top 406 to define a height of the cup body 402. It will be apparent to a person skilled in the art that the shape of the cup body 402 may not be limited to the embodiment as shown in the FIG. 8 and FIG. 9, and cup body of other shapes may also be used. The cup body 402 made of stainless steel thereby making the reusable cup durable and long lasting. The cup body 402 may be coated with an industrial porcelain enamel, ceramic coating or other forms of Nano coating (e.g. ceramic nanoparticle coating) and surface treatments on both exterior and interior of the cup body 402. The cup body 402 along with the steel body and the abovementioned coating may provide elegant appearance as well as good taste of beverage when using the reusable cup 400.

The reusable cup 400 further includes a rubber sleeve 410 for covering the cup body 402. In other words, the rubber sleeve 410 may act as soft cover surrounding the cup body 402 through which the customer can hold the reusable cup 400. As shown in FIG. 9, the internal surface of the rubber sleeve 410 may include a plurality of ridges 412 arranged horizontally throughout the internal surface forming an array of horizontal circular stripes around the cup body 402. When arranged on the cup body 402, the plurality of ridges 412 come in contact with the side wall 408 of the cup body 402. Each of the ridges 412 are arranged at a predefined distance from the adjacent ridge 412 thereby creating an air gap between the rubber sleeve 410 and the cup body 402. A person skilled in the art will appreciate that the air gap will reduce the heat conduction between the cup body 402 and the rubber sleeve 410 thereby making the reusable cup safe to hold when the reusable cup contains a hot beverage.

The reusable cup 400 further includes an identification tag 414 for storing information associated with a customer as well as the beverages ordered by the customer. In particular, the identification tag 414 may store information such as the name of the customer, the preference of the beverage of the customer, specifically, information relating to the type and quantity of the beverage. The identification tag may further store information of the type and quantity of the additives (for example, sugar, milk, and the like) that the customer selects while ordering the beverage. Further, as explained above, the sensor 162 of the vending machine 100 may communicate with the identification tag 414 of the reusable cup 400 when the reusable cup is placed in the pigeon hole unit 130.

The identification tag may be usually installed below the cup body 402. In a preferred embodiment, the identification tag may be a Radio Frequency Identification (RFID) tag, and specifically on-metal RFID tag. Therefore, when the RFID tag is attached to the cup body 402, the steel body of the cup body 402 amplifies as an antenna for the identification tag reader located above the reusable cup 400. Further, an RFID antenna 418 for emitting the identity and the personal information stored in the RFID tag. The RFID tag and the RFID antenna 418 are wired via a communication wire 420 for transferring the identity and the personal information.

The reusable cup 400 further includes a lid 416 adapted to fit on the open top 406 of the cup body 402 for covering & sealing the reusable cup 400 to prevent spillage of the beverage. The lid 416 may be adapted to fit on the open top via any means known in the prior art. In an embodiment, the lid 416 may be snapped onto the cup body for easy of usage. In another embodiment, the lid 416 may be screwed onto the cup for secure sealing. According to an embodiment, the lid 416 of the reusable cup 400 may be made of a transparent material that enables to see an interior of the reusable cup 400.

The reusable cup 400 may further include a suction cup 422 adapted to fit on a bottom of the reusable cup 400 for firmly gripping the reusable cup 400 to a surface. The suction cup 422 may help in keeping the reusable cup firm on surfaces such as, a dashboard of the car while driving. The reusable cup may further include a cup grip 424 in surrounding contact with the cup body 402 for facilitating holding of the reusable cup 400. The cup grip 424 is adapted to provide a cool area for gripping the reusable cup even with hot beverage inside the reusable cup 400. In certain embodiments, the cup grip 424 may include a provision for holding a stirrer or spoon 426 as shown in FIG. 8.

The reusable cup 400 comprises a temperature sensor to determine a temperature of the at least one beverage inside the reusable cup. The temperature sensor may help a customer to gauge the temperature of the beverage inside the reusable cup, and may help him to take action according to it. Further, the reusable cup 400 may include a heater for keeping the at least one beverage inside the reusable cup to be at a predetermined temperature within a predetermined period of time. The heater may include an active heater with a local power source and/or a passive heater for heating by induction.

Figure 10:
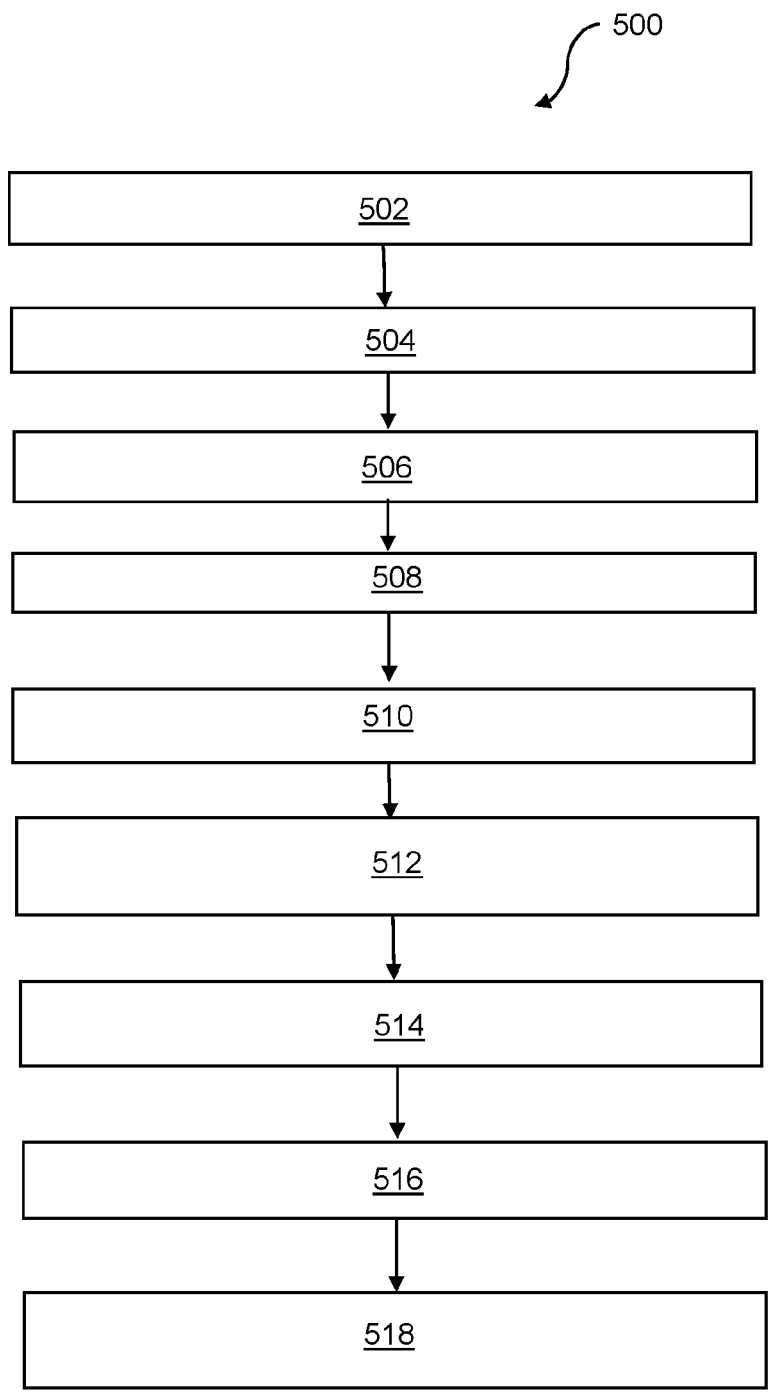
FIG. 10 illustrates a flowchart depicting a method of operating an automatic beverage vending machine, in accordance with an exemplary embodiment of the present disclosure.

Referring now to FIG. 10, a flowchart depicting a method 500 of operating the vending machine 100 is illustrated, in accordance with an exemplary embodiment of the present disclosure. FIGS. 11-18 also illustrates the method of operating the vending machine 100 in accordance with an embodiment of the present disclosure. In an embodiment, the vending machine 100 may work with the reusable cup 400. In another embodiment, the vending machine 100 may work with any type of cup, for example, a disposable cup. For the ease of explanation, the method 500 herein describes the working of the vending machine 100 with the reusable cup 400. While using the vending machine 100 for the first time, a customer can purchase the reusable cup 400 from the vending machine 100. The vending machine 100 may store a plurality of the reusable cups 400 which a customer can purchase from the order panel and/or an application software installed on his or her smart phone. At the time of purchasing the reusable cup 400, personal information of the customer would be registered into the identification tag of the reusable cup 400 via an identification tag writer. In case the customer had already purchased the reusable cup 400 earlier, the customer can directly initiate the process of operating the vending machine 100.

Figure 11:
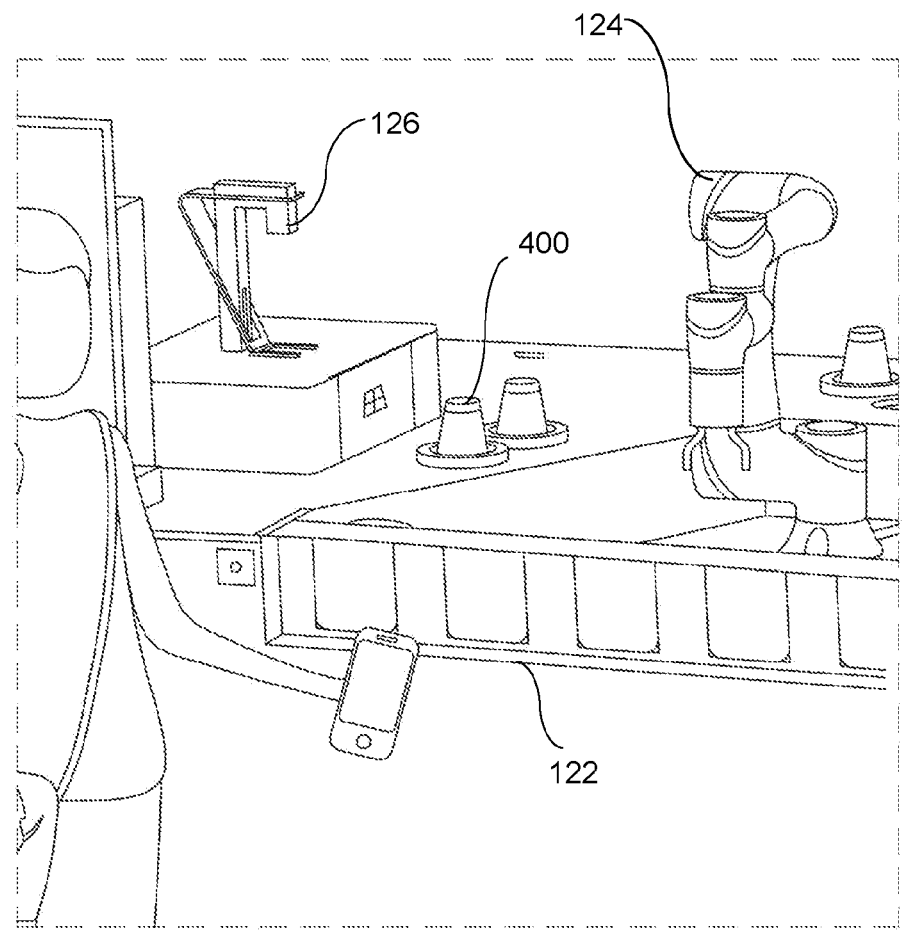
FIGS. 11 to 18 illustrate the method of operating the automatic beverage vending machine, in accordance with an exemplary embodiment of the present disclosure.

In a first step 502, the customer may order his or her desired beverage using the order panel 174 or the application software as shown in FIG. 11. Once the beverage is selected, the customer may proceed to make the payment for the selected beverage. The payment for the selected beverage may be made via the payment and receipt panel 176 of the vending machine 100 or the application software. On making the payment, a receipt may be generated which will be either dispensed from the Point Of Sale Terminal 176 in a hard copy (paper) format or will be directly sent to the mobile device in a soft copy format.

Figure 12:
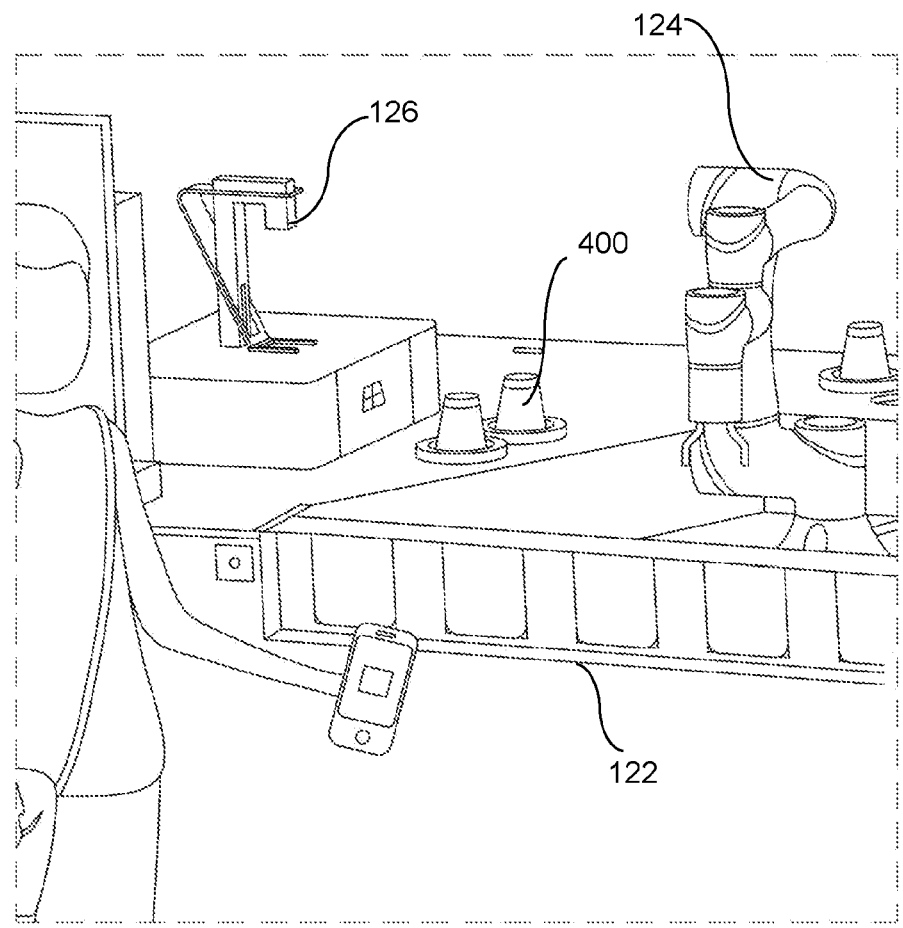
Figure 13:
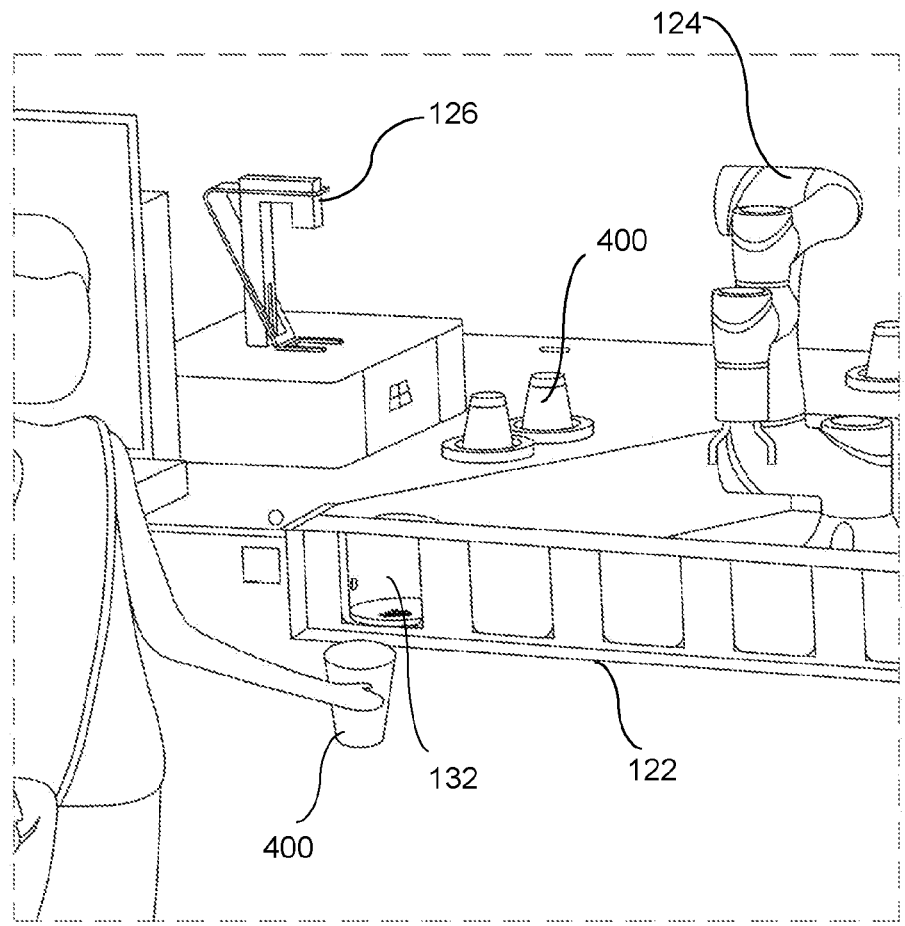
Figure 14:
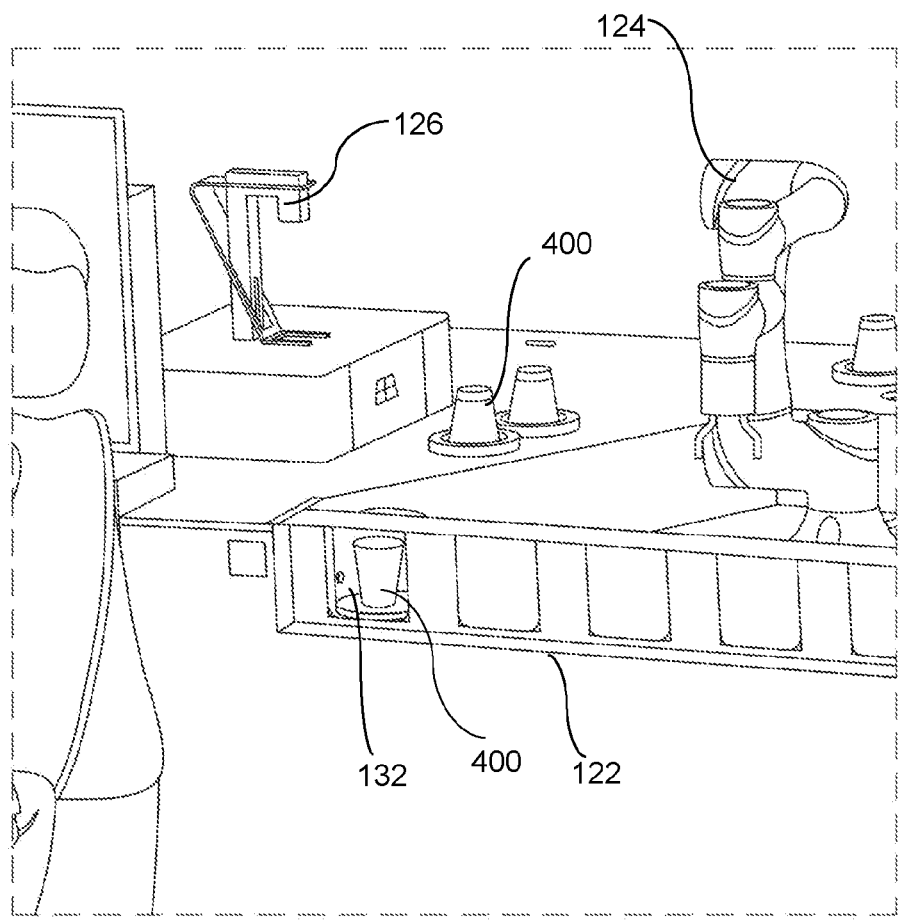

In the second step 504 and FIGS. 12-14, the vending machine 100 will receive the cup in the receiving station. In order to receive the reusable cup 400, the vending machine 100 will determine a vacant pigeon hole unit 130 in the receiving station 122, and display the identification number of the pigeon hole unit on the automatic curtain 180 so that the customer would know where he or she should place the reusable cup 400. On receiving the identification number of the pigeon hole unit 130, the customer may input the code in the input panel 178 to confirm his or her arrival. When the code is matched, the respective pigeon hole cup holder 132 would rotate up to 180 degrees from the interior of the vending machine 100 to the exterior of the vending machine 100 to receive the reusable cup 400.

In a third step 506, the vending machine 100 detects whether the reusable cup 400 is in a ready state to receive the beverage. The ready state of the reusable cup 400 is determined by various factors that are programmed into the system. For example, whether the lid 416 from the reusable cup 400 is removed, and/or whether the reusable cup 400 is fully empty, and/or whether the reusable cup 400 includes stains of the beverage which the customer had during the previous usage. The vending machine 100 may detect the state of the reusable cup 400 via any means known in the art. In an embodiment, through the use of computer vision with individual cameras installed above the reusable cups 400 in the pigeon hole unit 130, edge AI inferencing is performed to recognize if the lid 416 has been removed, or if the reusable cup 400 is dirty or if the reusable cup 400 is not empty. Such measures prevent the reusable cup 400 that is half full, dirty or covered with lid 416 or have other substances inside the reusable cup 400 that might cause food poisoning or subsequent overfilling from entering into the vending machine 100. Photo evidence is taken of the reusable cup 400 and stored in the database for verification in future if issues arise.

In a fourth step 508, the vending machine 100 generates an alert if the reusable cup 400 placed in the pigeon hole cup holder 132 is not ready. The alert generated by the vending machine 100 may be a warning message for example "Please remove the lid", "Please clean the cup", "Please empty the cup" etc. on the automatic curtain 180. Further, the vending machine 100 may also generate audio message along with the visual message in some scenarios.

Figure 15:
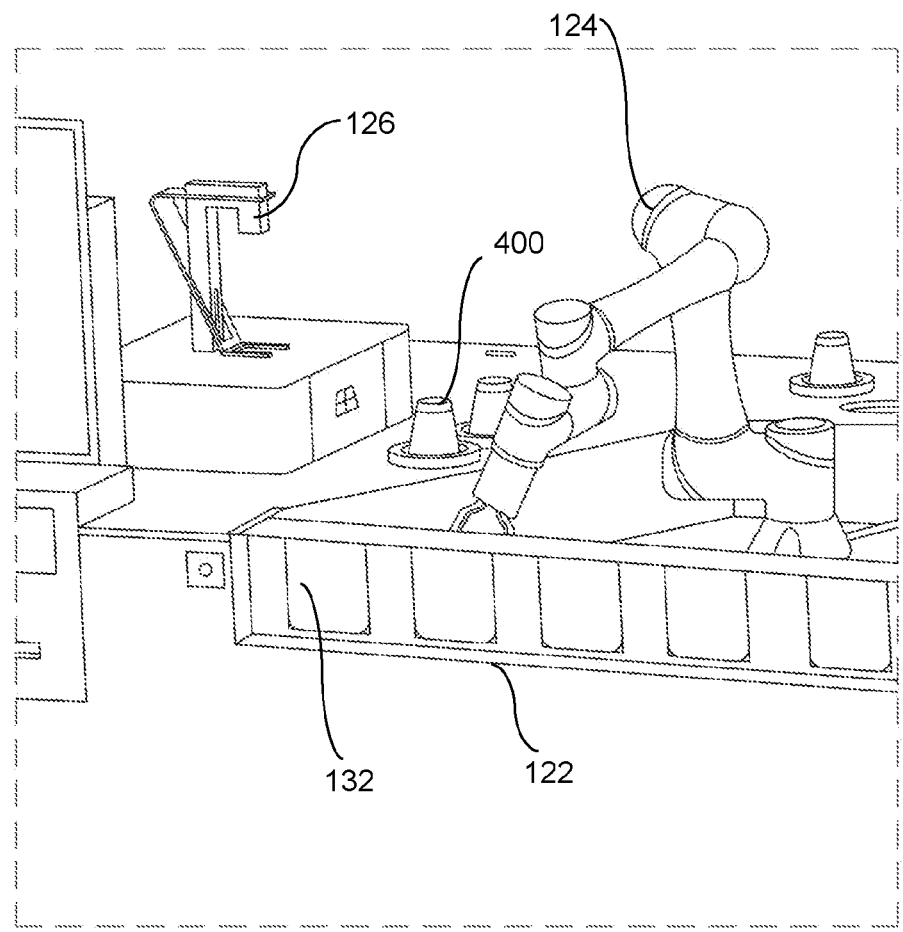

In the fifth step 510 and FIG. 15, the vending machine 100 operates the receiving station 122 for moving the reusable cup 400 from an exterior of the vending machine 100 to an interior of the vending machine 100. It will be apparent to a person skilled in the art that in a scenario where the reusable cup 400 was already in the ready state, the vending machine 100 directly moves the reusable cup 400 to the interior of the vending machine 100. The vending machine 100 includes the sensor 162 to verify whether the correct reusable cup has been placed within the correct pigeon hole unit.

Figure 16:
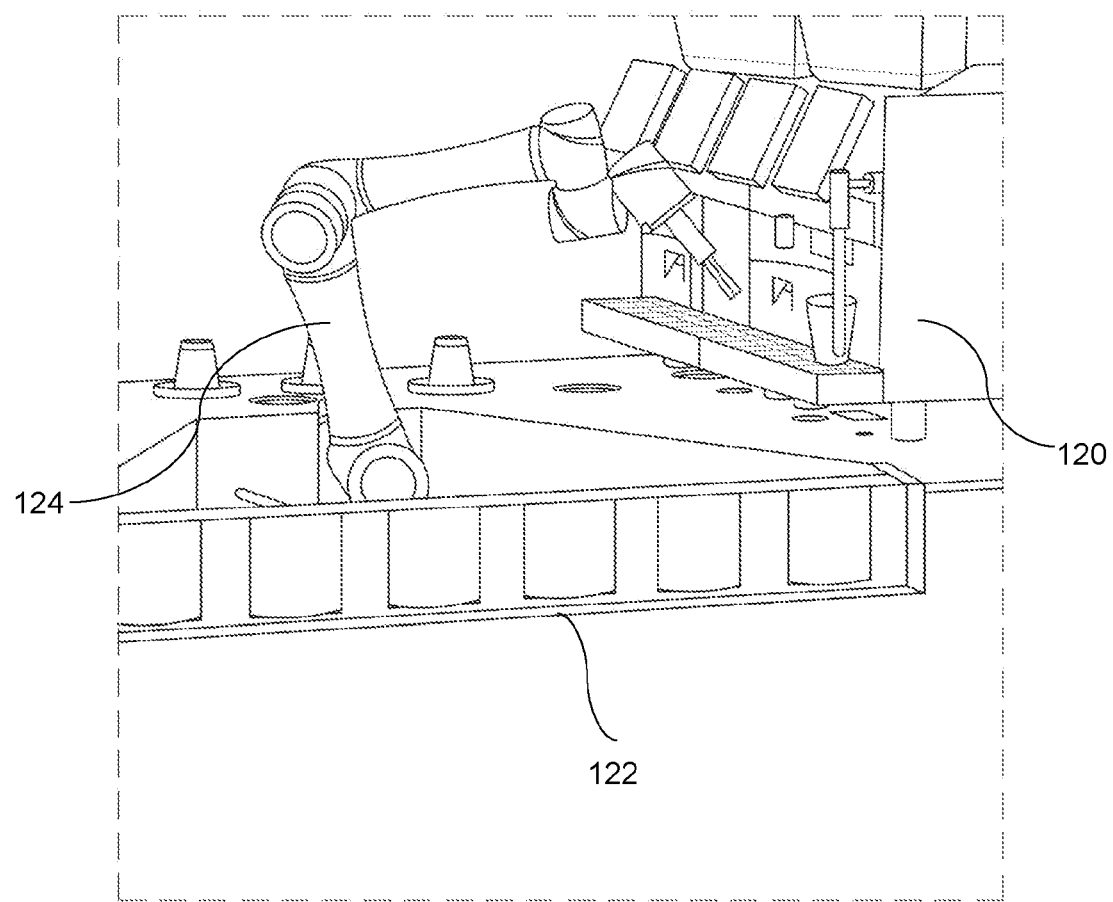

In the sixth step 512 and FIG. 15-16, the conveying mechanism 124 is operable for transferring the reusable cup 400 from the receiving station 122 to the beverage maker 120. In particular, the robotic arm 170 would pick up and place the reusable cup 400 under the correct spout 126 to receive the selected beverage into the reusable cup 400. In case where the beverage is made of multiple ingredients, the robotic arm 170 will move the reusable cup to each of the spouts 126 in the programmed order. For example, if cold juice is selected by the customer, the robotic arm will move the reusable cup 400 to the spout 126 for receiving juice, and then to the spout 126 for receiving ice.

In the seventh step 514, the vending machine 100 controls the beverage maker 120 to dispense the beverage into the reusable cup 400. Based on the order selected by the customer, the beverage maker 120 will prepare and/or dispense the beverage into the reusable cup 400 placed below the spout 126 of the beverage maker 120.

Figure 17:
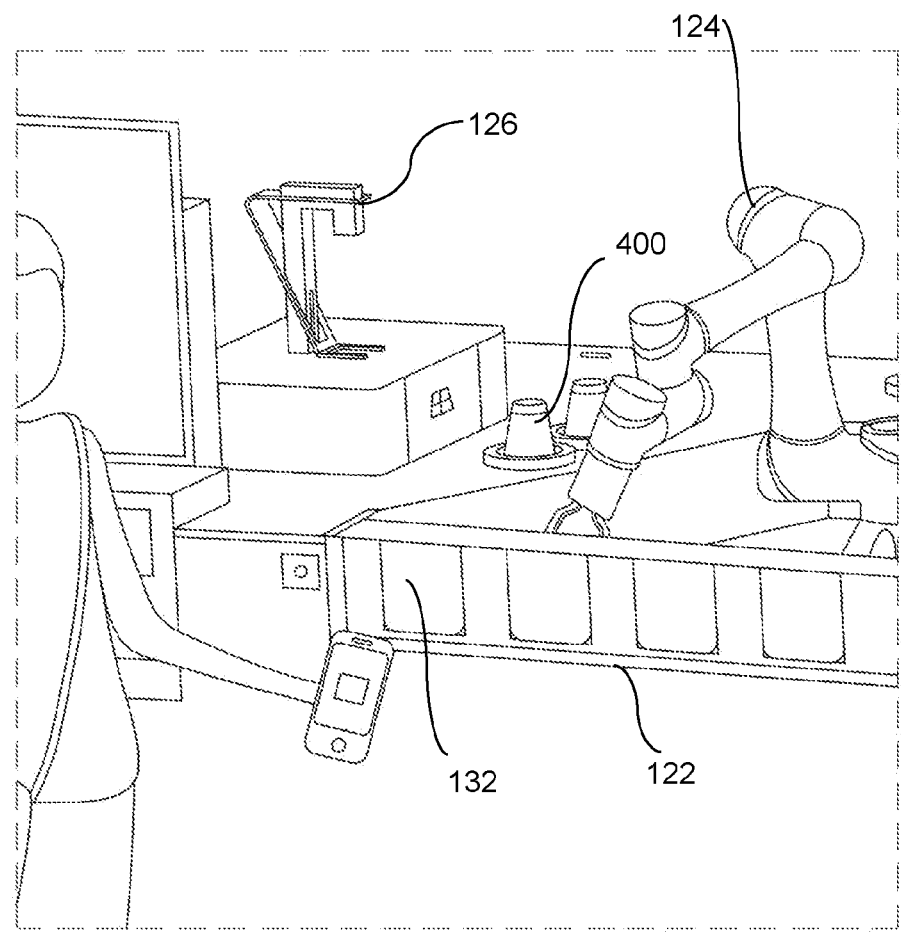

In the eight step 516 and FIG. 17 when the beverage is about to be completed, a notification would be sent to the customer on the application software. Once the beverage is filled in the reusable cup 400, the vending machine 100 controls the conveying mechanism 124 to transfer the reusable cup 400 filled with the beverage to the receiving station 122. In particular, the robotic arm 170 would pick up and place the reusable cup 400 at the vacant pigeon hole unit 130. Information is then sent to the customer for informing him or her which pigeon hole unit 130 the reusable cup 400 is placed in via the application software as well as the automatic curtain 180. In this step, the customer would be required to input the code provided on the application software to verify the correct reusable cup with ordered beverage is collected by the correct customer.

Figure 18:
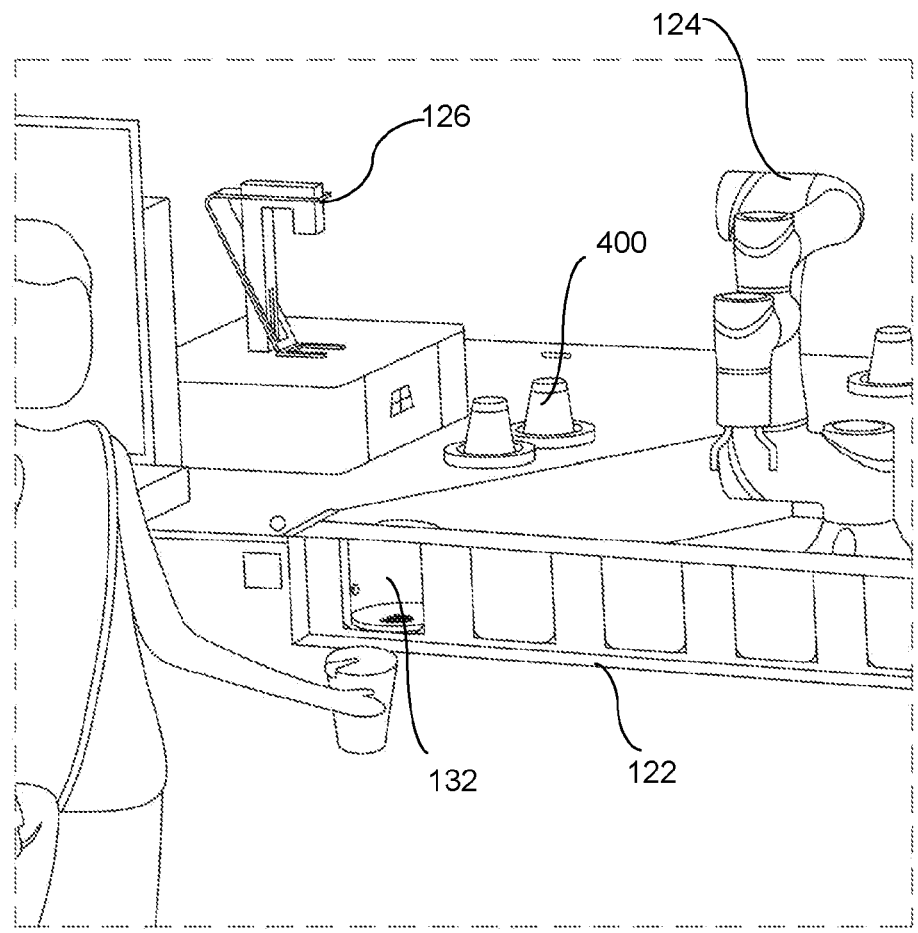

In the ninth step 518 and FIG. 18, the vending machine 100 operates the receiving station 122 for moving the reusable cup 400 from the interior of the vending machine 100 to the exterior of the vending machine 100. The customer would pick up the reusable cup 400 filled with the ordered beverage.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope consistent with the principles and the novel and inventive features disclosed or suggested herein. Accordingly, the disclosure is anticipated to hold on to all other such alternatives, modifications, and variations that fall within the scope of the present disclosure and appended claims.

The invention claimed is:

1. An automatic beverage vending machine, comprising:
   an at least one beverage maker operable for making at least one beverage;
   a receiving station operable for receiving at least one cup at an exterior of the automatic beverage vending machine and moving the at least one cup to an interior of the automatic beverage vending machine;
   a conveying mechanism operable for transferring the at least one cup from the receiving station to the at least one beverage maker in order to receive the at least one beverage into the at least one cup;
   a controller connected to the at least one beverage maker, the receiving station and the conveying mechanism, and is operable for coordinating movement of receiving the at least one cup, transferring the at least one cup and dispensing the at least one beverage into the at least one cup; and
   an integrated station that integrates a delivering station with the receiving station, and operable for receiving the at least one cup and/or delivering the at least one cup filled with the at least one beverage,
   wherein the receiving station, the delivering station, the integrated station or a combination of any of these stations comprise at least one pigeon hole unit operable for handling the at least one cup,
   wherein the at least one pigeon hole unit comprises a pigeon hole cup holder operable for holding the at least one cup and a pigeon hole receptacle for rotating the pigeon hole cup holder.

2. The automatic beverage vending machine of claim 1, wherein the at least one pigeon hole unit comprises a lock for enabling authorized retrieval of the at least one cup at the at least one pigeon hole unit.

3. The automatic beverage vending machine of claim 1, wherein the pigeon hole cup holder comprises a drip tray for catching a drip of the at least one beverage falling from the at least one cup.

4. The automatic beverage vending machine of claim 1, wherein the pigeon hole unit comprises a detector operable for detecting a readiness of the at least one cup before being moved to the interior of the automatic beverage vending machine.

5. The automatic beverage vending machine of claim 4, wherein the detector is connected to the controller, the controller being operable to generate an alert if the at least one cup is in an unready state, and control the receiving station to transfer the at least one cup from the exterior of the automatic beverage vending machine to the interior of the automatic beverage vending machine if the at least one cup is in a ready state.

6. The automatic beverage vending machine of claim 1, wherein the conveying mechanism comprises a robotic arm for transferring the at least one cup to the receiving station and the at least one beverage maker.

7. The automatic beverage vending machine of claim 1 further comprising an automatic curtain connected to the controller, being operable to cover the interior of the automatic beverage vending machine and/or expose the interior of the automatic beverage vending machine and a display mode for text and pictorial images.

8. The automatic beverage vending machine of claim 1 further comprising an order panel connected to the controller, being operable to
   display an option of beverages, and
   facilitate a selection of a beverage from the option of beverages.

9. The automatic beverage vending machine of claim 1 further comprising a Point Of Sale (POS) Terminal connected to the controller, being operable to
   facilitate a payment for a selected beverage, and
   dispense a receipt after making the payment for the selected beverage.

10. The automatic beverage vending machine of claim 1 further comprising an input panel to enable an input of a code by a customer for facilitating a delivery of the at least one cup filled with the beverage to the customer.

11. The automatic beverage vending machine of claim 1 further comprising a cup washer configured to wash the at least one cup.

12. The automatic beverage vending machine of claim 1 further comprising a cup holding station for keeping the at least one cup filled with the at least one beverage at a predetermined temperature.

13. The automatic beverage vending machine of claim 1, wherein the at least one cup comprises a reusable cup.

14. A reusable cup that is operable for being used with the vending machine of claim 1, the reusable cup comprising
   a cup body having a base, an open top at an opposite end, and a sidewall extending between the base and the open top to define a height,
   wherein the cup body is made of steel and coated with an industrial porcelain enamel.

15. The reusable cup of claim 14 further comprising an identification tag for storing an information associated with a customer as well as at least one beverage ordered by the customer.

16. The reusable cup of claim 14 further comprising a rubber sleeve for covering the cup body, the rubber sleeve and the cup body have an air gap between them.

17. The reusable cup of claim 14 further comprising a lid adapted to fit on the open top of the cup body for covering & sealing the reusable cup.

18. The reusable cup of claim 14 further comprising a suction cup adapted to fit on a bottom of the cup body for gripping the reusable cup to a surface.

* * * * *